United States Patent
Zhu et al.

(10) Patent No.: US 9,378,362 B2
(45) Date of Patent: Jun. 28, 2016

(54) SYSTEM AND METHOD OF MONITORING ATTACKS OF CROSS SITE SCRIPT

(71) Applicant: Alibaba Group Holding Limited, Grand Cayman (KY)

(72) Inventors: Rong Zhu, Beijing (CN); Xiaoshuan Li, Beijing (CN); Ziyi Yi, Beijing (CN); Tianhe Xu, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 192 days.

(21) Appl. No.: 14/094,501

(22) Filed: Dec. 2, 2013

(65) Prior Publication Data
US 2014/0165192 A1 Jun. 12, 2014

(30) Foreign Application Priority Data

Dec. 6, 2012 (CN) .......................... 2012 1 0521400

(51) Int. Cl.
| | |
|---|---|
| *H04L 29/00* | (2006.01) |
| *G06F 21/55* | (2013.01) |
| *G06F 21/54* | (2013.01) |
| *H04L 29/06* | (2006.01) |

(52) U.S. Cl.
CPC ................ *G06F 21/55* (2013.01); *G06F 21/54* (2013.01); *H04L 63/145* (2013.01); *H04L 63/1466* (2013.01); *G06F 2221/2119* (2013.01)

(58) Field of Classification Search
CPC ....................................................... G06F 11/00
USPC ......................................................... 726/22
See application file for complete search history.

(56) References Cited

U.S. PATENT DOCUMENTS

| | | | |
|---|---|---|---|
| 7,343,626 B1 | 3/2008 | Gallagher | |
| 7,359,976 B2 | 4/2008 | Ross et al. | |
| 8,112,799 B1 | 2/2012 | Loiodice et al. | |
| 8,495,137 B2 | 7/2013 | Amit et al. | |
| 8,505,080 B2 | 8/2013 | Lee et al. | |
| 8,615,804 B2 | 12/2013 | Mui et al. | |
| 2004/0260754 A1 | 12/2004 | Olson et al. | |
| 2009/0119769 A1 | 5/2009 | Ross et al. | |
| 2009/0165124 A1 | 6/2009 | Spektor | |
| 2009/0193497 A1 | 7/2009 | Kikuchi et al. | |
| 2009/0249489 A1 | 10/2009 | Livshits et al. | |
| 2009/0282480 A1* | 11/2009 | Lee et al. ........................ 726/22 |
| 2010/0125913 A1 | 5/2010 | Davenport et al. | |
| 2010/0218253 A1 | 8/2010 | Sutton et al. | |

OTHER PUBLICATIONS

PCT Search Report and Written Opinion mailed Mar. 18, 2014 for PCT Application No. PCT/US13/72664, 10 Pages.

* cited by examiner

*Primary Examiner* — Jeffrey Pwu
*Assistant Examiner* — Michael D Anderson
(74) *Attorney, Agent, or Firm* — Lee & Hayes, PLLC

(57) ABSTRACT

The present disclosure provides techniques for monitoring a cross site scripting attack. These techniques may receive and reply to, by a computing device, a service request from a client terminal. The computing device may then redefine a scripting internal function applied by the cross site scripting attack, and return redefined information for the scripting internal function to the client terminal. The computing device may monitor calling information of the client terminal in relation to the redefined scripting internal function, and analyze the security of the calling information. The computing device may monitor an attacking source, an attacking time period, leakage information in the attack, and/or a vulnerability point in the attack that are associated with the cross site scripting attack.

20 Claims, 4 Drawing Sheets

SYSTEM AND METHOD OF MONITORING ATTACKS OF CROSS SITE SCRIPT

CROSS REFERENCE TO RELATED PATENT APPLICATIONS

This application claims priority to Chinese Patent Application No. 201210521400.8, filed on Dec. 6, 2012, entitled "System and Method of Monitoring Attacks of Cross Site Script," which is hereby incorporated by reference in its entirety.

TECHNICAL FIELD

The present disclosure relates to a networking security field, and more particularly to a system and a method for monitoring a cross site scripting attack.

BACKGROUND

Recently, a focus on software security has been turned to network attacks in a client terminal from network attacks in a server terminal. Cross site scripting (XSS) attacks are regarded as the main threat for the security of networking programs. The cross site scripting attacks usually happen by using security loopholes of a program and other network vulnerabilities to cause devastating results. Sometimes the cross site scripting attacks may be turned into a virus or a network worm that can be self-propagated, therefore causing more serious damage. For example, the website "Myspace" was attacked by a cross site scripting attack to cause an enormous number of clients to receive a degree of a million requests, and thereafter the website was forced to shut down in 2005. In 2009, the website "Twitter" was attacked by two cross site scripting attacks that caused a huge amount of client terminals to post praise articles for a worm. In 2010, the website "Apache Foundation" was attacked by a reflective cross site scripting attack through the website's program for question tracking purposes. In addition, on 28 Jun. 2011, a large scale of cross site scripting attack occurred on the website "Sina Weibo" that caused severe damage to its account security.

Since cross site scripting attacks were identified, people have started to study how to detect and further defend against them. The tools for detecting cross site scripting attacks are mainly classified as a centralized detecting tool and a client terminal detecting tool.

The centralized detecting tools generally are designed to attack a visiting link by sending a structured attacking string to a website, inserting the attaching string into the transferring parameters of a program, monitoring the related response, and determining whether the website has a security risk of a cross site scripting attack. If the attack strings appears in its original form in a response, it is confirmed that the program is vulnerable to cross site scripting attacks. However, there are a limited number of attacking strings that can be defined; so the method thereof cannot cover all kinds of attacking situations. Therefore, this method cannot fully detect all situations, and therefore has a low protecting efficiency. This method is used as a basic checking tool.

On the other hand, a client detecting tool is required to be installed in the client terminal by a user. This tool detects whether a risky function of an operating system is performed in interfaces of the user's operating system, and determines whether the client terminal is attacked by analyzing the calling of functions of the operating system. However, analyzing the calling of the functions of the operating system requires obtaining a relative permission, and this tool has to be installed on the client terminal. This results in high costs. Moreover, the tool focuses more on protection for a client terminal; so the protection in relation to the website is not enough. In addition, this tool cannot automatically notify the service providers who are vulnerable to solve or prevent the vulnerability.

Furthermore, the conventional tools for detecting cross site scripting attacks cannot monitor the clients' behaviors; so it is difficult to effectively obtain the attack sources. Therefore, the conventional tools cannot warn and notify users to trigger an automatic defense while the attacks are occurring.

SUMMARY

Accordingly, there is a need to provide a system and a method for efficiently monitoring cross site scripting attacks with low cost.

The present disclosure provides a system for monitoring a cross site scripting attack. The system may include a program service module including a business module and a redefining module. The business module may be configured to receive and reply to a service request from a client terminal. The redefining module may be configured to redefine a scripting internal function applied by the cross site scripting attack and to return redefined information for the scripting internal function to the client terminal. The system may also include a monitoring module configured to monitor calling information of the client terminal in relation to the redefined scripting internal function. The system may also include an analyzing module configured to analyze the security of the calling information.

The present disclosure also provides a method for monitoring a cross site scripting attack. The method may include receiving and replying to, by a computing device, a service request from a client terminal. The computing device may then redefine a scripting internal function applied by the cross site scripting attack and return redefined information for the scripting internal function to the client terminal. The computing device may also monitor calling information of the client terminal in relation to the redefined scripting internal function, and analyze module for analyzing the security of the calling information.

In the system and the method of the present disclosure, embodiments monitor the calling information of the client terminal in relation to the scripting function applied by the cross site scripting attack; so various cross site scripting attacks can be detected with the advantages of high coverage, good monitoring efficacy, and high application matching.

In addition, the embodiments of the present disclosure instantly record the information including the client's behavior, the client's account, the IP address, the context environment where the scripting is executed, and abnormal calling information; so that the attacking source, the attacking time period, the leakage information in the attack, and the vulnerability point in the attack can be precisely configured.

Furthermore, in the embodiments of the present disclosure, the present disclosure may cross platforms and terminals without being affected by the client's operation systems. It may not be necessary to install extra software in the client terminal. This protects all clients requesting the service.

The above is a schematic description for people to understand and achieve the technical means of the present disclosure. To clarify the above objects, characteristics, and advantages of the present disclosure, the illustrative figures are associated with the embodiments in the following description.

This Summary is not intended to identify all key features or essential features of the claimed subject matter, nor is it intended to be used alone as an aid in determining the scope of the claimed subject matter.

BRIEF DESCRIPTION OF THE DRAWINGS

The Detailed Description is described with reference to the accompanying figures. The use of the same reference numbers in different figures indicates similar or identical items.

DETAILED DESCRIPTION

The embodiments of the present disclosure may be best understood by referring to the following detailed description and the accompanying drawings. It should be understood that the embodiments above should not be interpreted as limiting the present disclosure.

Figure 1:
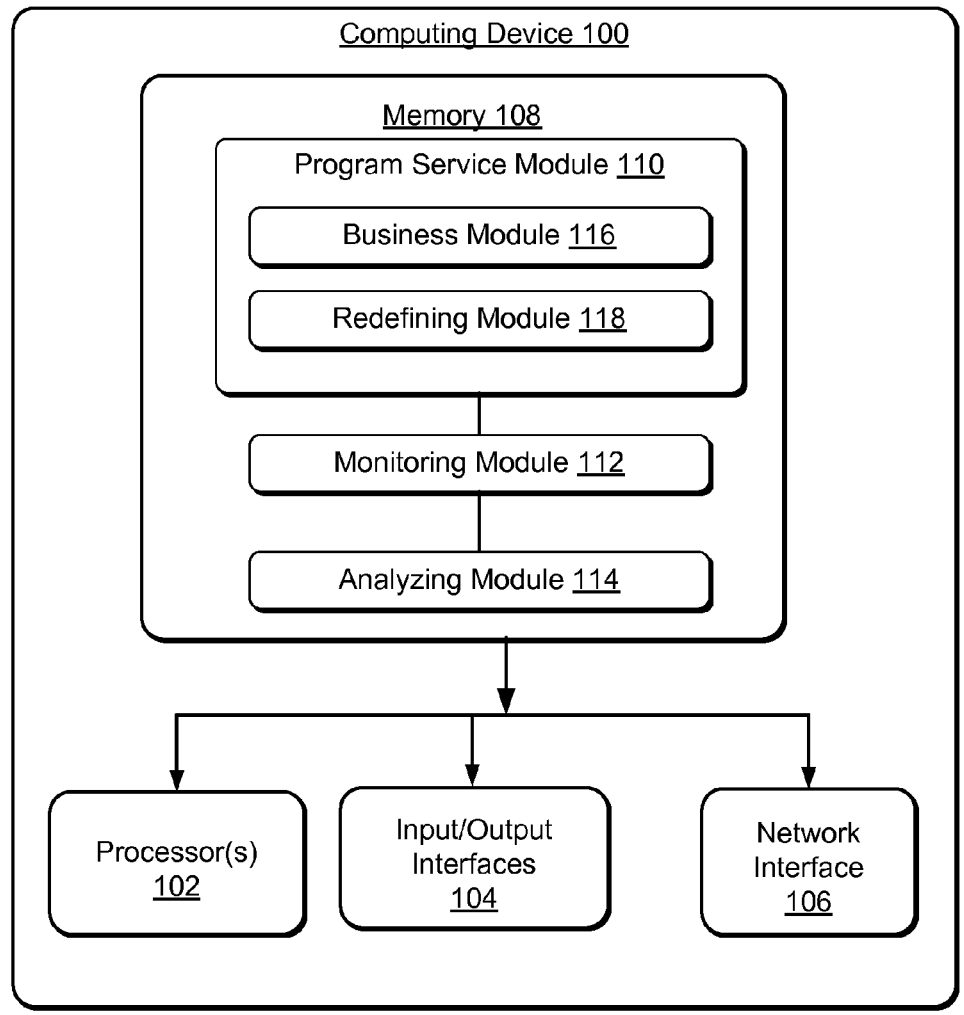
FIG. 1 is a schematic diagram illustrating a system for monitoring a cross site scripting attack.

FIG. 1 is a schematic diagram illustrating a system for monitoring a cross site scripting attack. The system includes a computing device 100. The computing device 100 may be a user device or a server for monitoring a cross site scripting attack. In one exemplary configuration, the computing device 100 includes one or more processors 102, input/output interfaces 104, network interface 106, and memory 108.

The memory 108 may include computer-readable media in the form of volatile memory, such as random-access memory (RAM) and/or non-volatile memory, such as read only memory (ROM) or flash RAM. The memory 108 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 108 in more detail, the memory 108 may include a program service module 110, a monitoring module 112, and an analyzing module 114. The program service module 110 may include a business module 116 and a redefining module 118. The business module 116 may receive a service request from a client terminal and responses thereafter. The redefining module 118 may determine a scripting internal function that is usually applied by the cross site scripting attack and redefine this function.

The scripting internal function is an internal function of a scripting language, including a function for creating a page element such as document.createElement, a function for executing an external link code such as document.Write and window.Location, and a function for displaying a page such as window.alert, window.confirm, and window.Prompt. The scripting language may be a JavaScript language. With the improving skills of hackers, there may be more scripting internal functions to be utilized in cross site scripting attacks; so it may be understood that the scripting internal functions used in cross site scripting attacks are not limited to scripting internal functions that are usually applied within a specific time period but are a library of functions that may be updated as illustrated below.

In some embodiments, the redefining the scripting internal function may include adding a monitoring code that monitors the calling of the scripting internal function into a data that is returned to the client terminal in response to a service request. In some embodiments, the data that is returned to the client terminal is added with a code to record calling information of the scripting internal function and to send the calling information to the monitoring module 112. In certain embodiments, a redefined function may be included in a head section of a webpage that is acting as a responding webpage when the business module 116 is to respond to a service request issued from the client terminal and send it to the client terminal. Since the head section is difficult to be changed in the client terminal, the safety of the redefined function is enhanced. The service request may be a Hypertext Transfer Protocol (HTTP) request.

The monitoring module 112 may be configured to monitor calling information of the redefined scripting internal function that is called by the client terminal and is returned from the program service module. In some instances, the monitoring module 112 monitors whether the redefined scripting internal function is called by the client terminal. If the redefined scripting internal function is called, the calling information in relation to the redefined scripting internal function may be recorded and sent to the analyzing module 114, or otherwise no information will be processed. The calling information comprises one or more items, such as, a context environment of the executing script while the redefined scripting internal function is called, a time period that the redefined scripting internal function is called, and a number of times that the redefined scripting internal function is called. Furthermore, the calling information also may include behavior of a client that calls the redefined scripting internal function. The calling information may further include at least one of a client action that calls the redefined scripting internal function, the client's account and IP address. The client terminals in the embodiment of the present disclosure generally include a browser installed in the client terminal.

In some embodiments, the monitoring code that monitors the calling of the redefined scripting internal function may be embedded in a program service page by means of the monitoring module 112. The application service page may be provided by a third party. The monitoring of the calling of the redefined scripting internal function may be carried out by embedding the monitoring code in the page of the third party by the monitoring module 112.

The analyzing module 114 may be configured to analyze the security of the calling information sent by the monitoring module 112 and to determine whether the calling information is a cross site scripting attack. The analyzing module 114 may determine whether the calling of the redefined scripting internal function is a cross site scripting attack or not based on a behavior characteristic. The behavior characteristic may include an application that the redefined scripting internal function activates, a number of times that the scripting internal function is called, sensitive information in a visit such as a client's cookie, a client's account, a client's password, and sensitive information in a transmission, etc.

Figure 2:
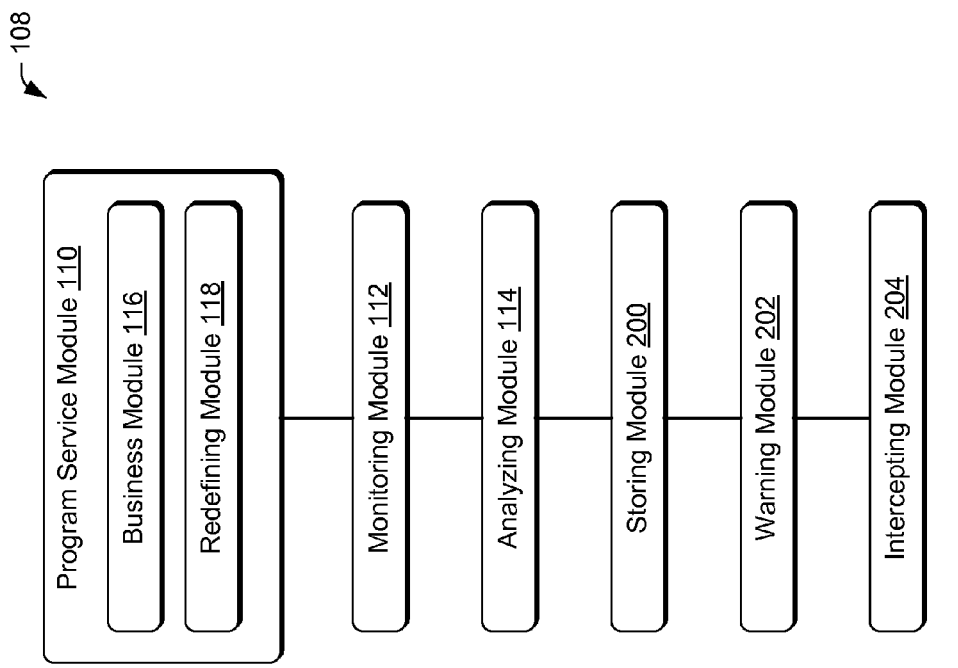
FIG. 2 is another schematic diagram illustrating a system for monitoring a cross site scripting attack.

As shown in FIG. 2, in some embodiments of the present disclosure, the memory may include program service module 110, a monitoring module 112, and an analyzing module 114. The system may also include a storing module 200, a warning module 202, and an intercepting module 204.

The storing module 200 may be configured to store the calling information of the scripting internal function while the analyzing module 114 determines that the calling of the redefined scripting internal function by the client terminal is a cross site scripting attack.

The warning module 202 may be configured to issue a security warning while the analyzing module 114 determines that the calling of the redefined scripting internal function is a cross site scripting attack. Specifically, the warning module 202 may send an e-mail of the security warning to a security staff of an attacked website; so the security staff of the website may immediately take defending actions for maintaining the business safety and repair the security loophole at the same time. By issuing the security warning, the early warning and the notification may be achieved so that the cross site scripting attack may be immediately found and be further monitored.

The intercepting module 204 may be configured to intercept a subsequent execution of the redefined scripting internal function, terminate the continuing rendering of the webpage and replace an attacked webpage with a safe page while the analyzing module 114 determines that a calling of the redefined scripting internal function is a cross site scripting attack. Attacks may be automatically blocked, while the cross site scripting attack is occurred, by intercepting the calling of the redefined scripting internal function.

Figure 3:
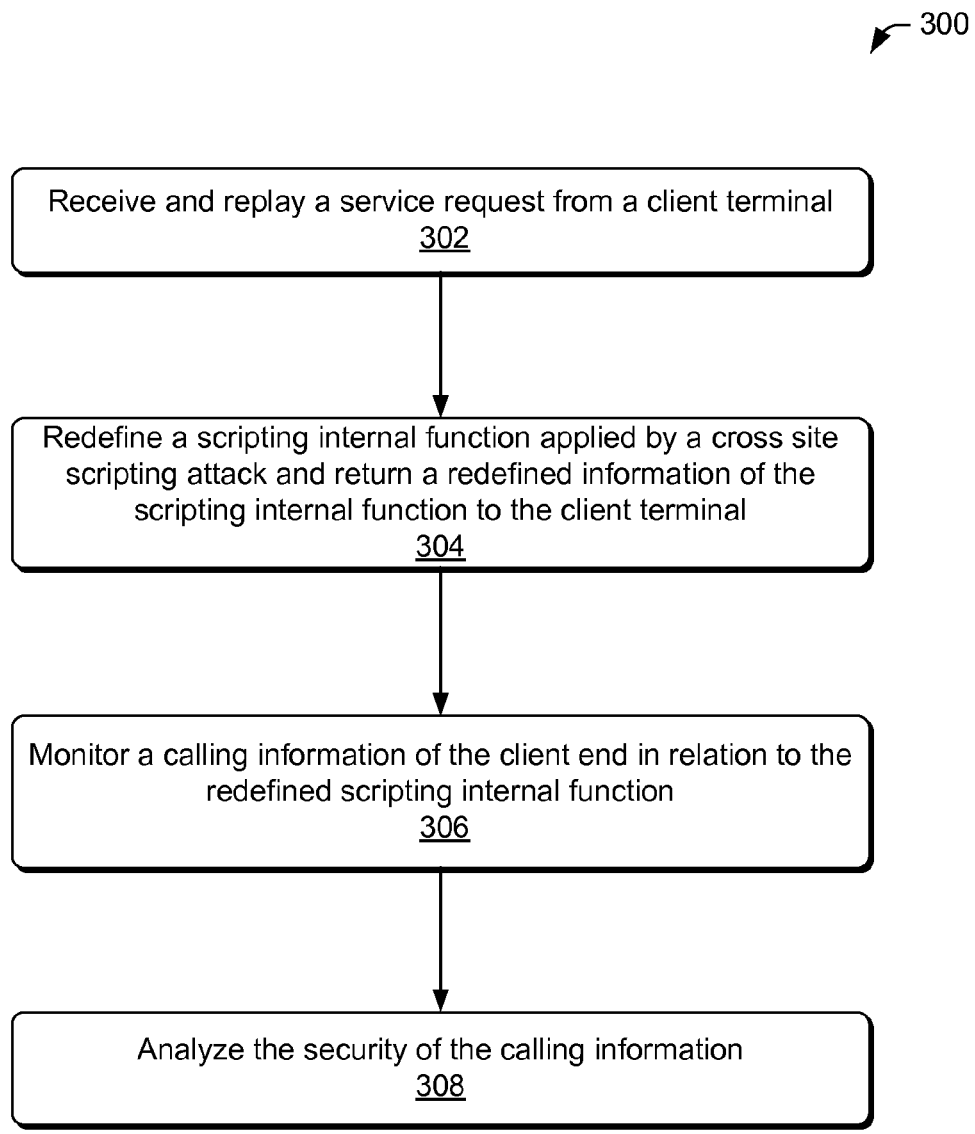
FIG. 3 is a flowchart illustrating a process for monitoring a cross site scripting attack.

FIG. 3 is a flowchart illustrating a process for monitoring a cross site scripting attack. The process may include receiving and replying to, by a computing device, a service request from a client terminal at 302. As a client terminal requests a specific application service, the client terminal sends a service request to a network server, and the computing device (e.g., the network server) receives the service request from the client terminal and replies the service request to the client terminal.

At 304, the computing device may redefine a scripting internal function applied by the cross site scripting attack and return redefined information of the scripting internal function to the client terminal.

In some embodiments, the network server may redefine the scripting internal functions that are frequently used in a cross site scripting attack and may add the functionality of obtaining the calling information of the scripting internal functions and of sending the calling information while the functionality of the scripting internal function is ensured. In other words, the redefining the scripting internal function may include adding a code that is for obtaining the calling information of the scripting internal functions and a code that is for sending the calling information into a returning data that is for responding to the service request. The redefined information may be included in a head section of a webpage that is a responding webpage issued by a network server in response to the service request.

The scripting internal function may be an internal function of a scripting language, including a function for creating a page element such as document.createElement, a function for executing an external link code such as document.Write and window.Location, and a function for displaying a page such as window.alert, window.confirm, and window.Prompt. The scripting language is a JavaScript language. With the improving skills of hackers, there may be more scripting internal functions to be utilized in the cross site scripting attack, so it may be understood that the scripting internal functions used in cross site scripting attacks are not limited to scripting internal functions that are usually applied within a specific time period but is a library of functions that may be updated as following the development of the technology.

At 306, the computing device may monitor calling information of the client terminal in relation to the redefined scripting internal function.

When the client terminal renders the webpage according to the information returned from the network server, the redefined scripting internal function will override the definition of the scripting internal function as defined by a scripting interpreter of the client terminal. Therefore, while the webpage is rendered by the service request having a risk of cross site scripting attack, the calling of the redefined scripting internal function will be triggered. Then, the client terminal renders the webpage by calling the redefined scripting internal function. When the redefined scripting internal function is called, the calling information of the redefined scripting internal function is monitored.

In some embodiments, the monitoring code for monitoring the calling of the redefined scripting internal function may be embedded in an application service page by the monitoring module. The application service page may be provided by a third party. The monitoring of the calling of the redefined scripting internal function may be carried out by embedding the monitoring code in the page of the third party by the monitoring module.

The calling information may include at least one of a context environment of the executing script while the redefined scripting internal function is called, a time period that the redefined scripting internal function is called, or a number of times that the redefined scripting internal function is called. Furthermore, the calling information also may include behavior of a client that calls the redefined scripting internal function. The calling information may further include at least one of the client's account and IP address.

At 308, the computing device may analyze the security of the calling information. In some embodiments, the computing device may determine whether the calling of the redefined scripting internal function is a cross site scripting attack or not based on a behavior characteristic. The behavior characteristic includes an application that the redefined scripting internal function calls, a number of times that the scripting internal function is called, sensitive information that the redefined scripting internal function visits, and/or sensitive information that the redefined scripting internal function transmits, etc.

The embodiments of present disclosure monitor the calling of the scripting internal function to thus predictively analyze a cross site scripting attack to have advantages of not being affected by the client's operation system. In addition, it is not necessary to install extra software in the client's terminal, thus protecting all clients requesting the service.

Figure 4:
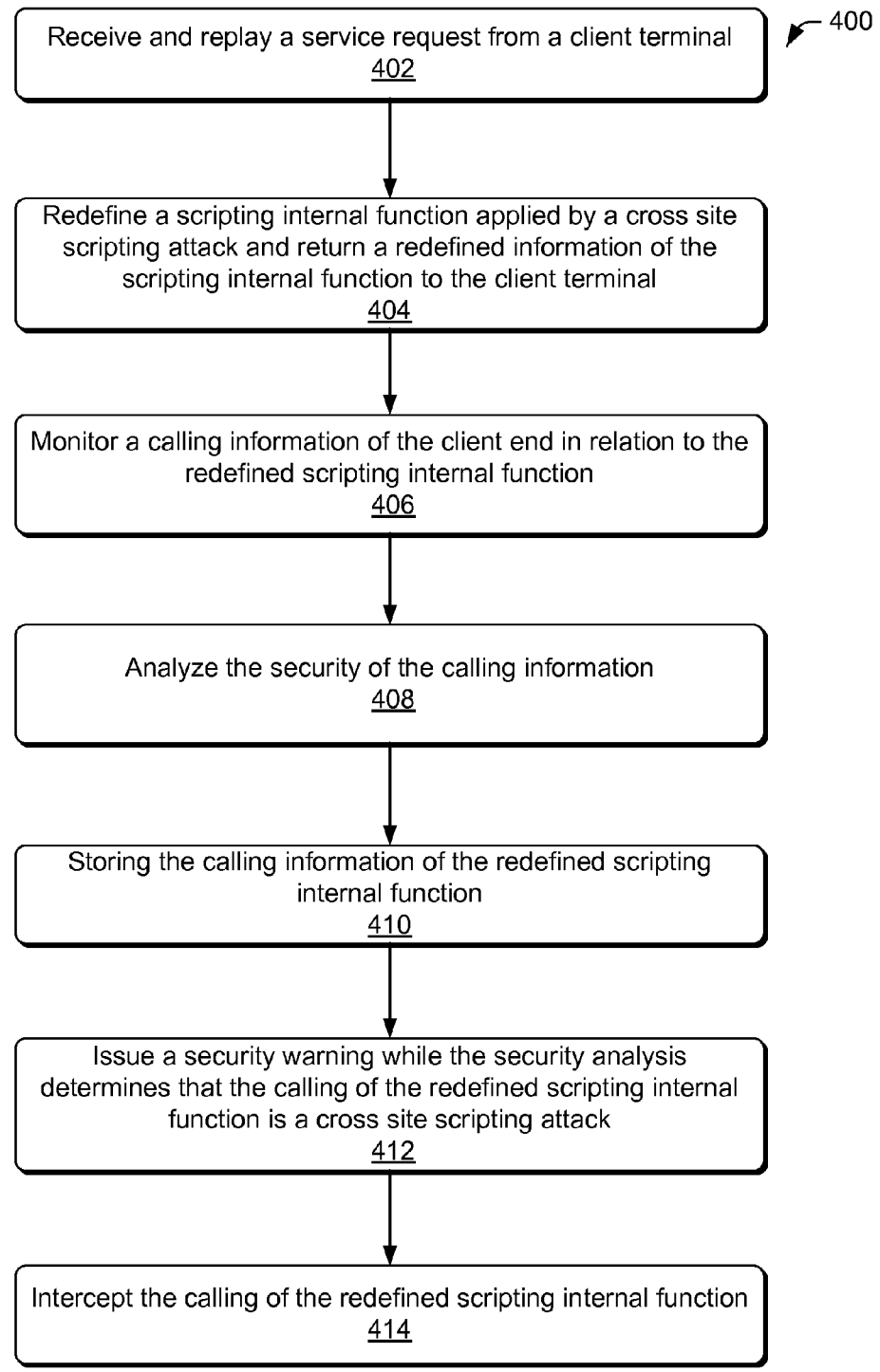
FIG. 4 is another flowchart illustrating a process for monitoring a cross site scripting attack.

FIG. 4 is another flowchart illustrating a process for monitoring a cross site scripting attack. At 402, the computing device may receive and reply to a service request from a client terminal. At 404, the computing device may redefine a scripting internal function applied by the cross site scripting attack and return redefined information of the scripting internal function to the client terminal. At 406, the computing device may monitor calling information of the client terminal in relation to the redefined scripting internal function. At 408, the computing device may analyze the security of the calling information.

AT 410, the computing device may store the calling information of the redefined scripting internal function. At 412, the computing device may issue a security warning while the security analysis determines that the calling of the redefined scripting internal function is a cross site scripting attack. In some embodiments, the computing device may send an e-mail of the security warning to a security staff of the attacked a website; so the security staff of the website may immediately take defensive actions to repair the security loophole while maintaining the business safety at the same time. By issuing the security warning, the early warning and the notification may be achieved so that the cross site scripting attack may be immediately identified and monitored accordingly.

At 414, the computing device may intercept the calling of the redefined scripting internal function. Attacks may be automatically prevented, while the cross site scripting attack is occurring, by intercepting the calling of the redefined scripting internal function.

As compared with the conventional technology, the present disclosure monitors an abnormal scripting executed by the user's browser to detect various cross site scripting attacks effectively. The elements of the present disclosure have high coverage, good monitoring efficacy, and high application matching. In addition, the information includes the client's behavior, the client's account, the IP address, the context environment where the scripting is executed, and/or abnormal calling information. This information is instantly recorded in the present disclosure so that the attacking source, the attacking time period, the leakage information in the attack, and/or the vulnerability point in the attack may be precisely configured. Furthermore, the present disclosure may cross the platforms and the terminals while not being affected by the client operation systems. In addition, it may not be necessary to install software in the client's terminal, thus protecting all clients of the service.

The Above description should only be considered as a description of the preferred embodiments of the present disclosure, and the present disclosure is not limited to these. Numerous modifications and variations should be regarded as still falling within the spirit and scope as defined in the claims.

What is claimed is:

1. A system for monitoring cross site scripting attacks, comprising:
    one or more processors; and
    memory including instructions executable by the one or more processors, which when executed perform the following steps:
        receiving and replying to a service request from a client terminal,
        redefining a scripting internal function applied by a cross site scripting attack, the redefining of the scripting internal function comprising adding a monitoring code to monitor the calling of the scripting internal function, and the monitoring code being embedded in an application service page of a third party,
        returning redefined information for the scripting internal function to the client terminal,
        monitoring calling information of the client terminal in relation to the redefined scripting internal function, and
        analyzing security of the calling information of the client terminal.

2. The system of claim 1, wherein the redefining of the scripting internal function comprises adding a monitoring code to monitor the calling of the scripting internal function.

3. The system of claim 1, wherein the redefined information in relation to the scripting internal function is formed in a head section of a corresponding webpage associated with a networking server that responds to the service request.

4. The system of claim 1, wherein the redefined scripting internal function comprises at least one of an internal function of a scripting language, a function for creating a page element, a function for executing an external link code, or a function for displaying a page.

5. The system of claim 4, wherein the scripting language is a JavaScript language.

6. The system as claimed in claim 1, wherein the redefined scripting internal function is associated with at least one of a documenting creating function, a document writing function, an object locating function, an alerting message function, a user confirmation function, or a user input function.

7. The system of claim 1, wherein the calling information of the redefined scripting internal function comprises at least one of a context environment of the scripting internal function, a calling time period of the redefined scripting internal function, a number of calling times for the redefined scripting internal function, a behavior of a client that calls the redefined scripting internal function, or one or more accounts and IP addresses associated with the client.

8. The system of claim 1, wherein the analyzing security of the calling information of the client terminal further comprises determining whether the calling of the redefined scripting internal function is a cross site scripting attack according to a behavior characteristic, the behavior characteristic includes at least one of an application that is called by the redefined scripting internal function, a number of times that the scripting internal function is called, a sensitive information in a visit, or a sensitive information in a transmission.

9. The system of claim 1, wherein the steps further comprise-a issuing a security warning in response to a determination that the calling of the redefined scripting internal function is the cross site scripting attack.

10. The system of claim 1, wherein the steps further comprise:
    intercepting a subsequent execution of the redefined scripting internal function,
    terminating rendering of a webpage associated with the service request; and
    replacing an attacked webpage with a safe page in response to a determination that a calling of the redefined scripting internal function is a cross site scripting attack.

11. A method for monitoring cross site scripting attacks, comprising:
    receiving and replying to a service request from a client terminal;
    redefining a scripting internal function applied by a cross site scripting attack, the redefining of the scripting internal function comprising adding a monitoring code to monitor the calling of the scripting internal function, and the monitoring code being embedded in an application service page of a third party;
    returning redefined information for the scripting internal function to the client terminal;
    monitoring calling information of the client terminal in relation to the redefined scripting internal function; and
    analyzing security of the calling information of the client terminal.

12. The method of claim 11, wherein the redefining of the scripting internal function comprises adding a monitoring code to monitor the calling of the scripting internal function.

13. The method of claim 11, wherein the redefined information in relation to the scripting internal function is formed in a head section of a corresponding webpage associated with a networking server that responds to the service request.

14. The method of claim 11, wherein the calling information of the redefined scripting internal function comprises at least one of a context environment of the scripting internal function, a calling time period of the redefined scripting internal function, a number of calling times for the redefined scripting internal function, a behavior of a client that calls the redefined scripting internal function, or one or more accounts and IP addresses associated with the client.

15. The method of claim 11, further comprising determining whether the calling of the redefined scripting internal function is a cross site scripting attack according to a behavior characteristic, the behavior characteristic includes at least one of an application that is called by the redefined scripting internal function, a number of times that the scripting internal function is called, a sensitive information that the redefined scripting internal function visits, or a sensitive information that the redefined scripting internal function transmits.

16. One or more computer-readable media storing computer-executable instructions that, when executed by one or more processors, instruct the one or more processors to perform acts comprising:
    receiving a service request from a client terminal;
    redefining a scripting internal function applied by a cross site scripting attack, the redefining of the scripting internal function comprising adding a monitoring code to monitor the calling of the scripting internal function, and the monitoring code being embedded in an application service page of a third party;
    returning redefined information for the scripting internal function to the client terminal;
    monitoring calling information of the client terminal in relation to the redefined scripting internal function; and
    analyzing security of the calling information of the client terminal.

17. The one or more computer-readable media of claim 16, wherein the acts further comprises issuing a security warning in response to a determination that the calling of the redefined scripting internal function is the cross site scripting attack.

18. The one or more computer-readable media of claim 17, wherein the acts further comprises
    intercepting a subsequent execution of the redefined scripting internal function;
    terminating rendering of a webpage associated with the webpage; and
    replacing an attacked webpage with a safe page in response to a determination that a calling of the redefined scripting internal function is a cross site scripting attack.

19. The one or more computer-readable media of claim 16, wherein the redefining the scripting internal function comprises adding a monitoring code to monitor the calling of the scripting internal function.

20. The one or more computer-readable media of claim 16, wherein the redefined information in relation to the scripting internal function is formed in a head section of a corresponding webpage associated with a networking server that responds to the service request.

* * * * *